US012615574B2

(12) United States Patent

Fujishiro et al.

(10) Patent No.: US 12,615,574 B2

(45) Date of Patent: Apr. 28, 2026

(54) COMMUNICATION CONTROL METHOD

(71) Applicant: KYOCERA Corporation, Kyoto (JP)

(72) Inventors: Masato Fujishiro, Yokohama (JP);
Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 680 days.

(21) Appl. No.: 18/056,658

(22) Filed: Nov. 17, 2022

(65) Prior Publication Data

US 2023/0089150 A1 Mar. 23, 2023

Related U.S. Application Data

(63) Continuation of application No. PCT/JP2021/018679, filed on May 17, 2021.

(60) Provisional application No. 63/026,242, filed on May 18, 2020.

(51) Int. Cl.
*H04W 48/02* (2009.01)
*H04W 48/08* (2009.01)

(52) U.S. Cl.
CPC ........... *H04W 48/02* (2013.01); *H04W 48/08* (2013.01)

(58) Field of Classification Search
CPC ..... H04W 48/02; H04W 48/08; H04W 48/12; H04W 84/047; H04W 88/04; H04W 88/08
See application file for complete search history.

(56) References Cited

U.S. PATENT DOCUMENTS

| | | | | |
|---|---|---|---|---|
| 2014/0051426 A1* | 2/2014 | Siomina | ................ | H04W 48/16 |
| | | | | 455/422.1 |
| 2019/0037491 A1* | 1/2019 | Sun | ........................ | H04W 72/04 |
| 2021/0352570 A1* | 11/2021 | Won | ........................ | H04W 48/02 |
| 2022/0029694 A1* | 1/2022 | Ishii | ........................ | H04W 48/12 |

OTHER PUBLICATIONS

Huawei, Hisilicon; "Summary of [AT109bis-e][024] 3X.304 CRs and IAB supporting in NPN"; 3GPP TSG-RAN WG2 Meeting #109bis electronic; R2-2004154; Apr. 20-30, 2020; Total 11 pages.
LG Electronics Inc.; "Consideration on cell reselection of IAB"; 3GPP TSG-RAN WG2 #103bis; R2-1815449; Oct. 8-12, 2018; Total 4 pages; Chengdu, China.

* cited by examiner

*Primary Examiner* — Matthew D. Anderson
*Assistant Examiner* — Dung L Lam
(74) *Attorney, Agent, or Firm* — Studebaker Brackett PLLC

(57) ABSTRACT

A communication control method is a method for selecting a candidate cell in which a relay node exists in a cellular communication system. The communication control method includes transmitting, by a node configured to manage a cell, a first information element indicating whether selection of the cell is barred, and a second information element regarding whether selection of another cell belonging to a frequency identical to a frequency of the cell is allowed when the selection of the cell is barred. The first information element is applied to both the relay node and a user equipment. The transmitting includes transmitting the second information element for the relay node as an information element different from the second information element for the user equipment.

5 Claims, 19 Drawing Sheets

300

NODE 500
(CELL #1)

IAB NODE 300
(IAB-MT)

S11

MIB
cellBarred, intraFreqReselection

S12

SIB1
iab-Support

S13

CELL SELECTION
CONTROL

```
MIB ::=                             SEQUENCE {
    systemFrameNumber               BIT STRING (SIZE (6)),
    subCarrierSpacingCommon         ENUMERATED {scs15or60, scs30or120},
    ssb-SubcarrierOffset            INTEGER (0..15),
    dmrs-TypeA-Position             ENUMERATED {pos2, pos3},
    pdcch-ConfigSIB1                PDCCH-ConfigSIB1,
    cellBarred                      ENUMERATED {barred, notBarred},
    intraFreqReselection            ENUMERATED {allowed, notAllowed},
    spare                           BIT STRING (SIZE (1))
}
```

FIG. 10

| iab-Support | cellBarred | intraFreqReselection | OPERATION OF IAB-MT |
|---|---|---|---|
| YES | - | - | SELECTION OF CELL IS ALLOWED |
| NO | notBarred | notAllowed/allowed (IGNORE) | SELECTION OF CELL IS BARRED SELECTION OF ANOTHER CELL AT SAME FREQUENCY IS ALLOWED |
| NO | Barred | allowed (NOT IGNORE) | SELECTION OF CELL IS BARRED SELECTION OF ANOTHER CELL AT SAME FREQUENCY IS ALLOWED |
| NO | Barred | notAllowed (NOT IGNORE) | SELECTION OF CELL IS BARRED SELECTION OF ANOTHER CELL AT SAME FREQUENCY IS BARRED |

FIG. 11

| intraFreq Reselection | intraFreq Reselection_IAB | OPERATION OF UE | OPERATION OF IAB-MT |
|---|---|---|---|
| Allowed | Allowed | SELECTION OF ANOTHER CELL AT SAME FREQUENCY IS ALLOWED | SELECTION OF ANOTHER CELL AT SAME FREQUENCY IS ALLOWED |
| notAllowed | Allowed | SELECTION OF ANOTHER CELL AT SAME FREQUENCY IS BARRED | SELECTION OF ANOTHER CELL AT SAME FREQUENCY IS ALLOWED |
| Allowed | notAllowed | SELECTION OF ANOTHER CELL AT SAME FREQUENCY IS ALLOWED | SELECTION OF ANOTHER CELL AT SAME FREQUENCY IS BARRED |
| notAllowed | notAllowed | SELECTION OF ANOTHER CELL AT SAME FREQUENCY IS BARRED | SELECTION OF ANOTHER CELL AT SAME FREQUENCY IS BARRED |

FIG. 13

Figure 17:
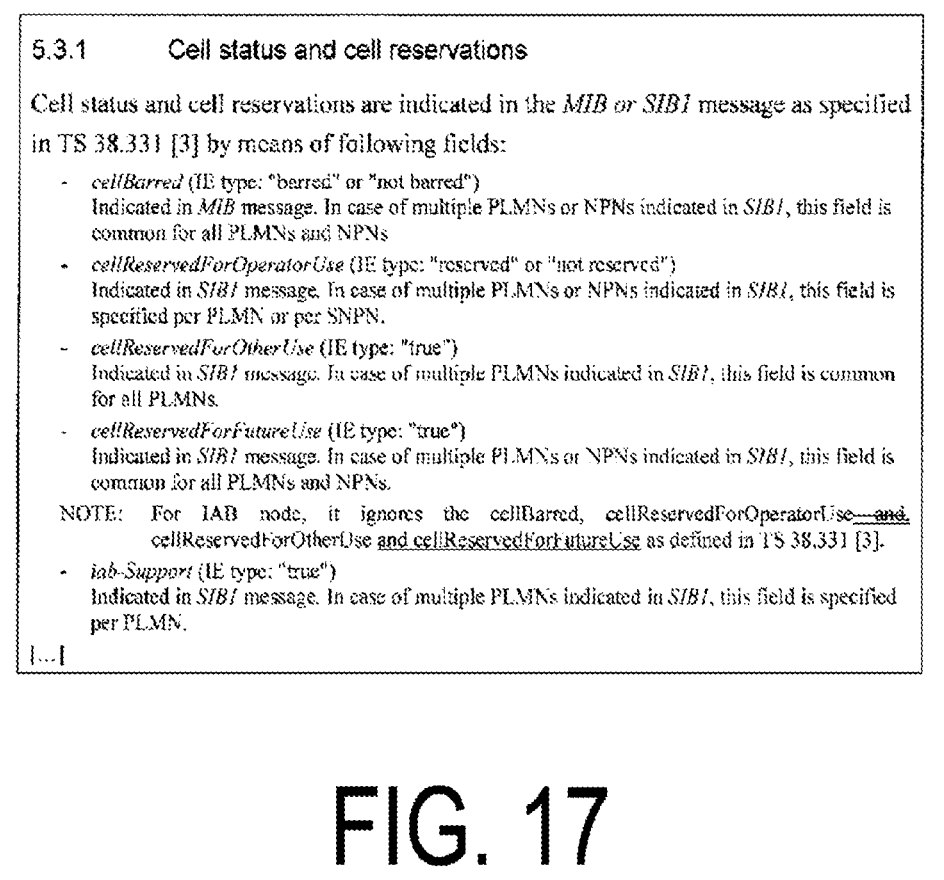

5.3.1    Cell status and cell reservations

Cell status and cell reservations are indicated in the *MIB or SIB1* message as specified in TS 38.331 [3] by means of following fields:

- *cellBarred* (IE type: "barred" or "not barred")
  Indicated in *MIB* message. In case of multiple PLMNs or NPNs indicated in *SIB1*, this field is common for all PLMNs and NPNs
- *cellReservedForOperatorUse* (IE type: "reserved" or "not reserved")
  Indicated in *SIB1* message. In case of multiple PLMNs or NPNs indicated in *SIB1*, this field is specified per PLMN or per SNPN.
- *cellReservedForOtherUse* (IE type: "true")
  Indicated in *SIB1* message. In case of multiple PLMNs indicated in *SIB1*, this field is common for all PLMNs.
- *cellReservedForFutureUse* (IE type: "true")
  Indicated in *SIB1* message. In case of multiple PLMNs or NPNs indicated in *SIB1*, this field is common for all PLMNs and NPNs.
- NOTE:    For IAB node, it ignores the cellBarred, cellReservedForOperatorUse ~~and~~ cellReservedForOtherUse and cellReservedForFutureUse as defined in TS 38.331 [3].
- *iab-Support* (IE type: "true")
  Indicated in *SIB1* message. In case of multiple PLMNs indicated in *SIB1*, this field is specified per PLMN.

```
SIB1 ::=        SEQUENCE {
    cellSelectionInfo              SEQUENCE {
        q-RxLevMin                     Q-RxLevMin,
        q-RxLevMinOffset               INTEGER (1..8)              OPTIONAL,     --
Need S
        q-RxLevMinSUL                  Q-RxLevMin                  OPTIONAL,     --
Need R
        q-QualMin                      Q-QualMin                   OPTIONAL,     --
Need S
        q-QualMinOffset                INTEGER (1..8)              OPTIONAL      --
Need S
        }                                                          OPTIONAL,     --
Cond Standalone
    cellAccessRelatedInfo          CellAccessRelatedInfo,
    connEstFailureControl          ConnEstFailureControl           OPTIONAL,     --
Need R
    si-SchedulingInfo              SI-SchedulingInfo               OPTIONAL,     --
Need R
    servingCellConfigCommon        ServingCellConfigCommonSIB      OPTIONAL,     --
Need R
    ims-EmergencySupport           ENUMERATED {true}               OPTIONAL,     --
Need R
    eCallOverIMS-Support           ENUMERATED {true}               OPTIONAL,     --
Cond Absent
    ue-TimersAndConstants          UE-TimersAndConstants           OPTIONAL,     --
Need R uac-BarringInfo                SEQUENCE {
        uac-BarringForCommon           UAC-BarringPerCatList       OPTIONAL,     --
Need S
        uac-BarringPerPLMN-List        UAC-BarringPerPLMN-List     OPTIONAL,     --
Need S
        uac-BarringInfoSetList         UAC-BarringInfoSetList,
        uac-AccessCategory1-SelectionAssistanceInfo CHOICE {
            plmnCommon                     UAC-AccessCategory1-
SelectionAssistanceInfo,
            individualPLMNList             SEQUENCE (SIZE (2..maxPLMN)) OF UAC-
AccessCategory1-SelectionAssistanceInfo
        }                                                          OPTIONAL      --
Need S
        }                                                          OPTIONAL,     --
Need R useFullResumeID                ENUMERATED {true}               OPTIONAL,     --
Need R lateNonCriticalExtension       OCTET STRING                    OPTIONAL,
    nonCriticalExtension           SIB1-v16xy-IEs                  OPTIONAL
}

SIB1-v16xy-IEs ::=             SEQUENCE {
    idleModeMeasurements-r16       ENUMERATED(ffs)                             posSI-
SchedulingInfoList-r16       PosSI-SchedulingInfoList-r16    OPTIONAL,  -- Need R
    intraFreqReselection-IAB-r16   ENUMERATED {notAllowed}         OPTIONAL,
    nonCriticalExtension           SEQUENCE {}                     OPTIONAL
}

UAC-AccessCategory1-SelectionAssistanceInfo ::=    ENUMERATED {a, b, c}
```

| SIB1 field descriptions |
|---|
| [...] |
| *intraFreqReselection-IAB* |
| Controls cell selection/reselection to intra-frequency cells when the highest ranked cell is barred, or treated as barred by the UE, as specified in TS 38.304 [20]. This IE is applicable only to IAB-MTs. |
| [...] |

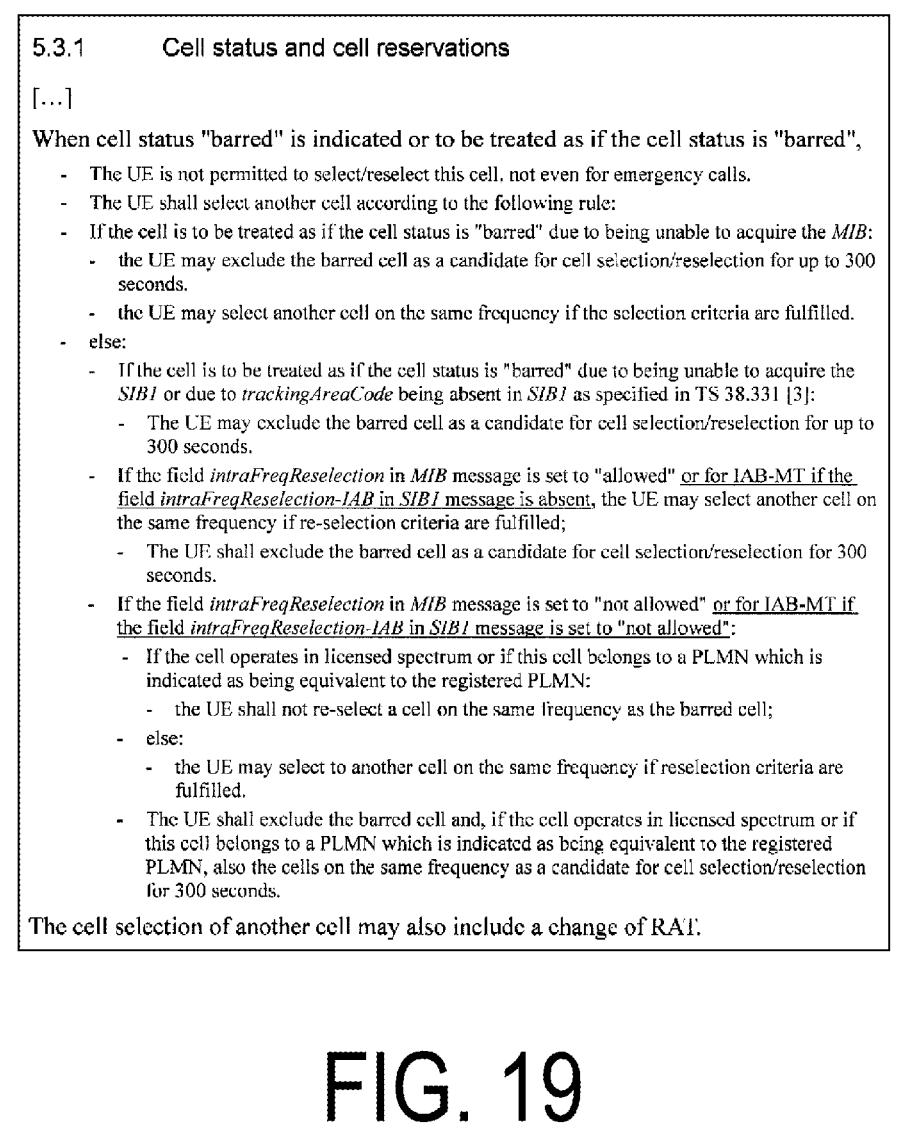

5.3.1      Cell status and cell reservations

[...]

When cell status "barred" is indicated or to be treated as if the cell status is "barred",

- The UE is not permitted to select/reselect this cell, not even for emergency calls.
- The UE shall select another cell according to the following rule:
- If the cell is to be treated as if the cell status is "barred" due to being unable to acquire the *MIB*:
    - the UE may exclude the barred cell as a candidate for cell selection/reselection for up to 300 seconds.
    - the UE may select another cell on the same frequency if the selection criteria are fulfilled.
- else:
    - If the cell is to be treated as if the cell status is "barred" due to being unable to acquire the *SIB1* or due to *trackingAreaCode* being absent in *SIB1* as specified in TS 38.331 [3]:
        - The UE may exclude the barred cell as a candidate for cell selection/reselection for up to 300 seconds.
    - If the field *intraFreqReselection* in *MIB* message is set to "allowed" or for IAB-MT if the field *intraFreqReselection-IAB* in *SIB1* message is absent, the UE may select another cell on the same frequency if re-selection criteria are fulfilled;
        - The UE shall exclude the barred cell as a candidate for cell selection/reselection for 300 seconds.
    - If the field *intraFreqReselection* in *MIB* message is set to "not allowed" or for IAB-MT if the field *intraFreqReselection-IAB* in *SIB1* message is set to "not allowed":
        - If the cell operates in licensed spectrum or if this cell belongs to a PLMN which is indicated as being equivalent to the registered PLMN:
            - the UE shall not re-select a cell on the same frequency as the barred cell;
        - else:
            - the UE may select to another cell on the same frequency if reselection criteria are fulfilled.
        - The UE shall exclude the barred cell and, if the cell operates in licensed spectrum or if this cell belongs to a PLMN which is indicated as being equivalent to the registered PLMN, also the cells on the same frequency as a candidate for cell selection/reselection for 300 seconds.

The cell selection of another cell may also include a change of RAT.

FIG. 19

COMMUNICATION CONTROL METHOD

RELATED APPLICATIONS

The present application is a continuation based on PCT Application No. PCT/JP2021/018679, filed on May 17, 2021, which claims the benefit of U.S. Provisional Application No. 63/026,242 filed on May 18, 2020. The content of which is incorporated by reference herein in their entirety.

TECHNICAL FIELD

The present disclosure relates to a communication control method used in a cellular communication system.

BACKGROUND OF INVENTION

The 3rd Generation Partnership Project (3GPP), which is a standardization project of a cellular communication system, has been studying introduction of a new relay node referred to as an Integrated Access and Backhaul (IAB) node. One or more relay nodes are involved in communication between a base station and user equipment, and perform relay for the communication.

SUMMARY

A communication control method according to a first aspect is a method for selecting a candidate cell in which a relay node exists in a cellular communication system. The communication control method includes transmitting, by a node configured to manage a cell, a first information element indicating whether selection of the cell is barred, and a second information element regarding whether selection of another cell belonging to a frequency identical to a frequency of the cell is allowed when the selection of the cell is barred, and ignoring, by the relay node, the first information element and the second information element.

A communication control method according to a second aspect is a method for selecting a candidate cell in which a relay node exists in a cellular communication system. The communication control method includes transmitting, by a node configured to manage a cell, a first information element indicating whether selection of the cell is barred, and a second information element regarding whether selection of another cell belonging to a frequency identical to a frequency of the cell is allowed when the selection of the cell is barred. The transmitting includes transmitting the second information element for the relay node as an information element different from the second information element for the user equipment.

A communication control method according to a third aspect is a method for selecting a candidate cell in which a relay node exists in a cellular communication system. The communication control method includes receiving, by a relay node from a cell, a first information element indicating whether selection of the cell is barred, and a second information element regarding whether selection of another cell belonging to a frequency identical to a frequency of the cell is allowed when the selection of the cell is barred, and in response to the first information element indicating that the selection of the cell is barred, determining whether the selection of another cell is allowed based on the second information element, and in response to the first information element indicating that the selection of the cell is not barred, ignoring the second information element.

BRIEF DESCRIPTION OF THE DRAWINGS

FIG. 10 is a diagram illustrating an MIB according to an embodiment.

FIG. 11 is a diagram illustrating cell selection control according to an embodiment.

FIG. 13 is a diagram illustrating cell selection control according to the variation.

FIG. 17 is a diagram illustrating an example of a specification change when the IAB node ignores cellReservedForFutureUse.

FIG. 18 is a diagram illustrating an example of a specification change when "intraFreqReselection-IAB" is introduced.

FIG. 19 is a diagram illustrating an example of a specification change when "intraFreqReselection-IAB" is introduced.

DESCRIPTION OF EMBODIMENTS

Figure 1:
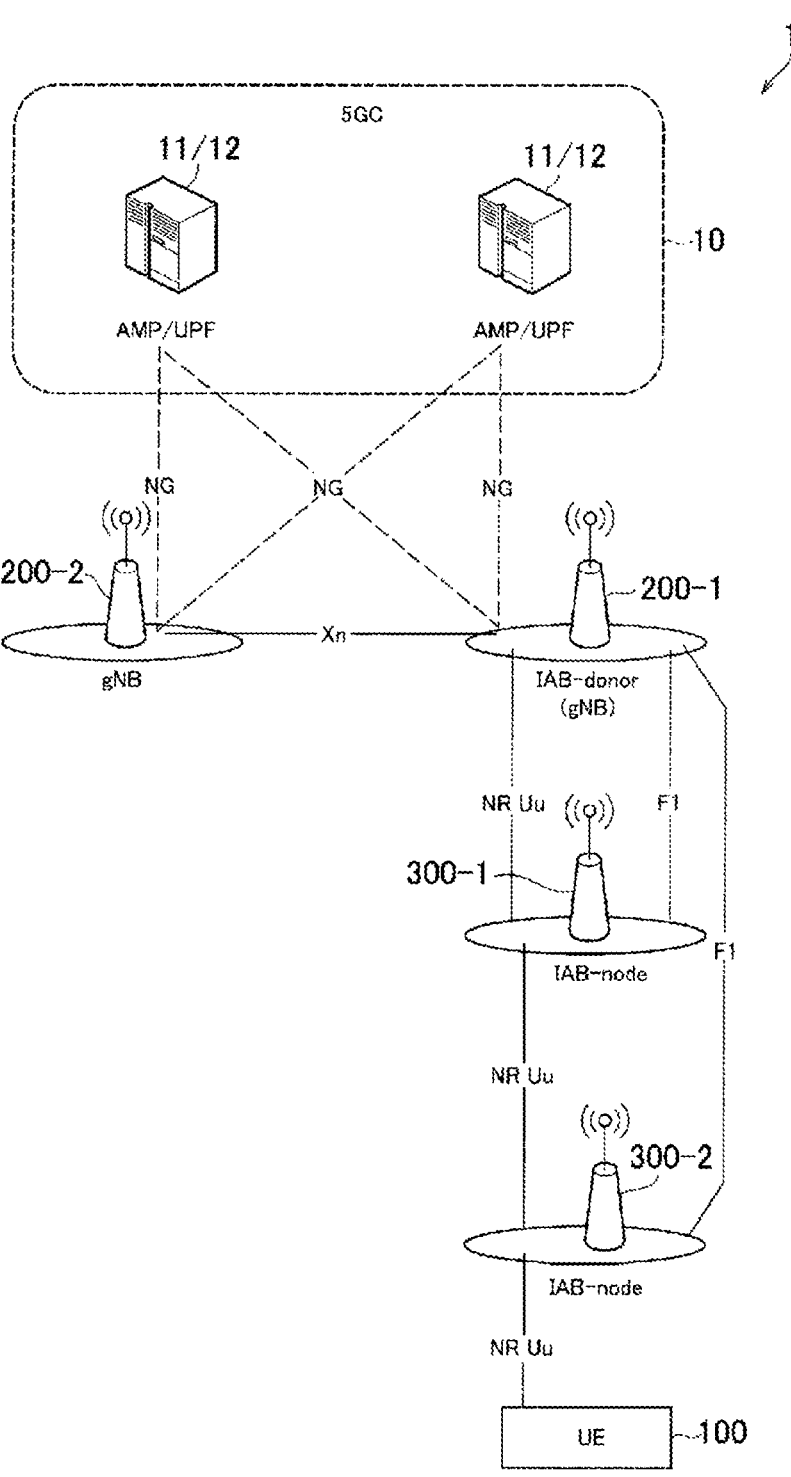
FIG. 1 is a diagram illustrating a configuration of a cellular communication system according to an embodiment.

A cellular communication system according to an embodiment will be described with reference to the drawings. In the description of the drawings, the same or similar parts are denoted by the same or similar reference signs.
Configuration of Cellular Communication System First, a configuration of the cellular communication system according to an embodiment will be described. FIG. 1 is a diagram illustrating a configuration of a cellular communication system 1 according to an embodiment.

The cellular communication system 1 is a fifth generation (5G) cellular communication system based on the 3GPP standard. Specifically, a radio access scheme in the cellular communication system 1 is New Radio (NR) being a radio access scheme of the 5G. Note that Long Term Evolution (LTE) may be at least partially applied to the cellular communication system 1.

As illustrated in FIG. 1, the cellular communication system 1 includes a 5G core network (5GC) 10, user equipment (UE) 100, a base station (referred to as a gNB) 200, and an IAB node 300. The IAB node 300 is an example of a relay node.

An example in which the base station is an NR base station will be mainly described below. However, the base station may be an LTE base station (i.e., an eNB).

The 5GC 10 includes an Access and Mobility Management Function (AMF) 11 and a User Plane Function (UPF) 12. The AMF 11 is an apparatus that performs various types of mobility controls and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

Each gNB 200 is a fixed wireless communication node and manages one or more cells. The term "cell" denotes a minimum unit of a wireless communication area. The term "cell" may denote a function or a resource for performing wireless communication with the UE 100. One cell belongs to one carrier frequency.

Each gNB 200 is mutually connected to the 5GC 10 via an interface referred to as an NG interface. FIG. 1 illustrates an example of two gNBs, a gNB 200-1 and a gNB 200-2 that are connected to the 5GC 10.

Each gNB 200 is interconnected to another neighboring gNB 200 via an inter-base station interface referred to as an Xn interface. FIG. 1 illustrates an example in which the gNB 200-1 is connected to the gNB 200-2.

Each gNB 200 may be divided into a central unit (CU) and a distributed unit (DU). The CU and the DU are interconnected via an interface referred to as an F1 interface. The F1 protocol is a communication protocol between CU and the DU, and includes an F1-C protocol corresponding to a protocol for a control plane and an F1-U protocol corresponding to a protocol for a user plane.

The cellular communication system 1 supports an IAB that uses NR for the backhaul to enable wireless relay of NR access. The donor gNB 200-1 is a gNB 200 corresponding to a terminal node of the NR backhaul on the network side and including additional functions that support the IAB. The backhaul is capable of multi-hop via a plurality of hops (i.e., a plurality of IAB nodes 300).

An example is illustrated in FIG. 1 in which an IAB node 300-1 is wirelessly connected to the donor gNB 200-1, an IAB node 300-2 is wirelessly connected to the IAB node 300-1, and the F1 protocol is transmitted via two backhaul hops.

The UE 100 is a mobile wireless communication apparatus that can perform wireless communication with cells. The UE 100 may be any type of apparatus as long as the UE 100 is an apparatus that performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor gNB 200-1 via the IAB node 300-2 and the IAB node 300-1.

Figure 2:
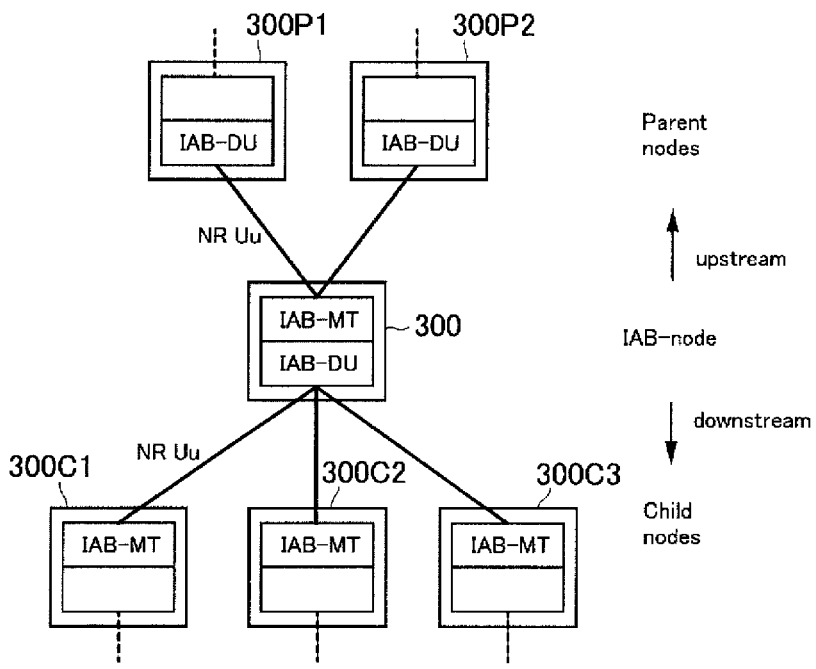
FIG. 2 is a diagram illustrating a relationship between an IAB node, parent nodes, and child nodes.

FIG. 2 is a diagram illustrating the relationship among the IAB node 300, the parent nodes, and the child nodes.

As illustrated in FIG. 2, each IAB node 300 includes an IAB-DU corresponding to a base station functioner and an IAB-Mobile Termination (MT) corresponding to a user equipment functioner.

Neighboring nodes on an NR Uu wireless interface of the IAB-MT (i.e., upper nodes) may be referred to as "parent nodes". The parent node is the DU of a parent IAB node or a donor gNB 200. A radio link between the IAB-MT and each parent node is referred to as a backhaul link. In FIG. 2, an example in which the parent nodes of the IAB node 300 are IAB nodes 300P1 and 300P2 is illustrated. Note that the direction toward the parent nodes is referred to as upstream.

Neighboring nodes on an NR access interface of the IAB-DU (i.e., lower nodes) may be referred to as "child nodes". The IAB-DU manages cells in a manner same as, and/or similar to the gNB 200. The IAB-DU terminates the NR Uu wireless interface to the UE 100 and the lower IAB nodes. The IAB-DU supports the F1 protocol for the CU of the donor gNB 200-1. In FIG. 2, an example in which the child nodes of the IAB node 300 are IAB nodes 300C1 to 300C3 is illustrated. Note that the direction toward the child nodes is referred to as downstream.

Figure 3:
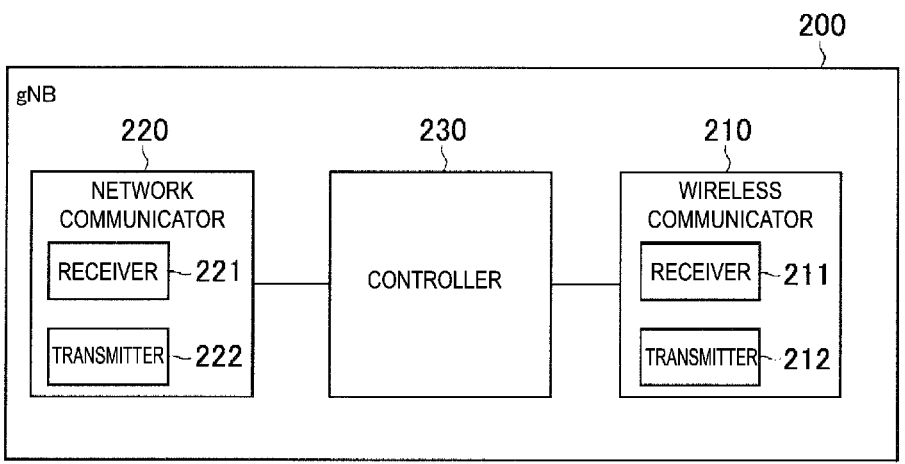
FIG. 3 is a diagram illustrating a configuration of a base station (gNB) according to an embodiment.

Configuration of Base Station A configuration of the gNB 200, corresponding to a base station according to an embodiment, will be described. FIG. 3 is a diagram illustrating a configuration of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of receptions under control of the controller 230. The receiver 211 includes an antenna, and converts a radio signal received by the antenna into a baseband signal (received signal) and outputs the baseband signal to the controller 230. The transmitter 212 performs various types of transmissions under control of the controller 230. The transmitter 212 includes an antenna, and converts a baseband signal (transmission signal) to be output by the controller 230 into a radio signal and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of receptions under control of the controller 230. The receiver 221 receives a signal from the outside and outputs the received signal to the controller 230. The transmitter 222 performs various types of transmissions under control of the controller 230. The transmitter 222 transmits a transmission signal output by the controller 230 to the outside.

The controller 230 performs various types of controls for the gNB 200. The controller 230 includes at least one memory and at least one processor electrically connected to the memory. The memory stores programs to be executed by the processor and information to be used for processes by the processor. The processor may include a baseband processor and a Central Processing Unit (CPU). The baseband processor performs modulation and demodulation, and coding and decoding of a baseband signal, and the like. The CPU executes the programs stored in the memory to perform various types of processes. The processor performs processing of the layers described below.

Configuration of Relay Node

Figure 4:
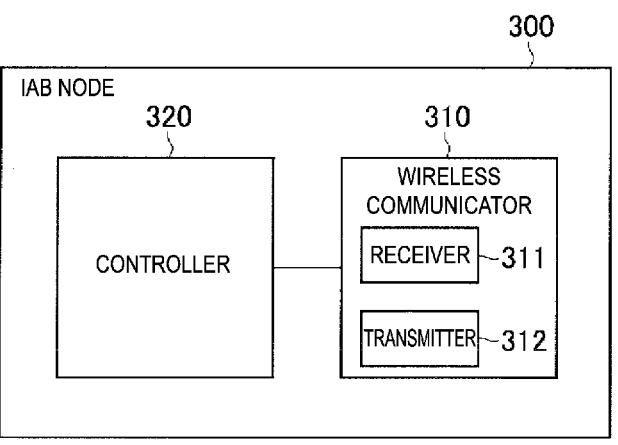
FIG. 4 is a diagram illustrating a configuration of a relay node (IAB node) according to an embodiment.

A configuration of the IAB node 300 that is a relay node according to an embodiment will be described. FIG. 4 is a diagram illustrating a configuration of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication (BH link) with the gNB 200 and performs wireless communication (access link) with the UE 100. The wireless communicator 310 for the BH link communication and the wireless communicator 310 for the access link communication may be provided separately.

The wireless communicator 310 includes a receiver 311 and a transmitter 312. The receiver 311 performs various types of receptions under control of the controller 320. The receiver 311 includes an antenna, and converts a radio signal received by the antenna into a baseband signal (received signal) and outputs the baseband signal to the controller 320. The transmitter 312 performs various types of transmissions under control of the controller 320. The transmitter 312 includes an antenna, and converts a baseband signal (transmission signal) to be output by the controller 320 into a radio signal and transmits the radio signal from the antenna.

The controller 320 performs various types of controls in the IAB node 300. The controller 320 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor performs processing of the layers described below.

Configuration of User Equipment

Figure 5:
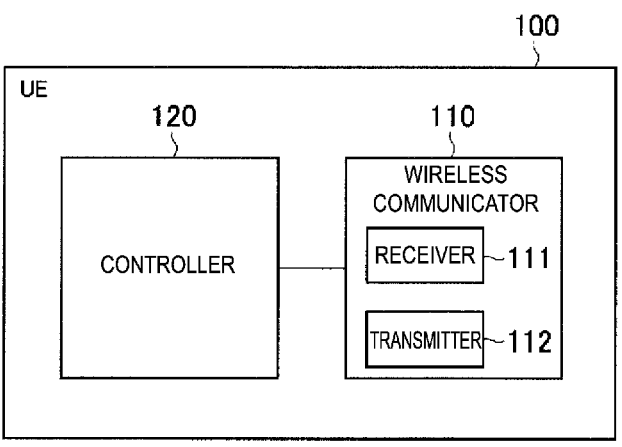
FIG. 5 is a diagram illustrating a configuration of a user equipment (UE) according to an embodiment.

A configuration of the UE 100, corresponding to user equipment according to an embodiment, will be described. FIG. 5 is a diagram illustrating a configuration of the UE 100. As illustrated in FIG. 5, the UE 100 includes a wireless communicator 110 and a controller 120.

The wireless communicator 110 performs wireless communication in the access link, specifically, wireless communication with the gNB 200 and wireless communication with the IAB node 300. The wireless communicator 110 may perform wireless communication in the sidelink, that is, wireless communication with another UE 100. The wireless communicator 110 includes a receiver 111 and a transmitter 112. The receiver 111 performs various types of receptions under control of the controller 120. The receiver 111 includes an antenna, and converts a radio signal received by the antenna into a baseband signal (received signal) and outputs the baseband signal to the controller 120. The transmitter 112 performs various types of transmissions under control of the controller 120. The transmitter 112 includes an antenna, and converts a baseband signal (transmission signal) to be output by the controller 120 into a radio signal and transmits the radio signal from the antenna.

The controller 120 performs various types of controls for the UE 100. The controller 120 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor performs processing of the layers described below.

Figure 6:
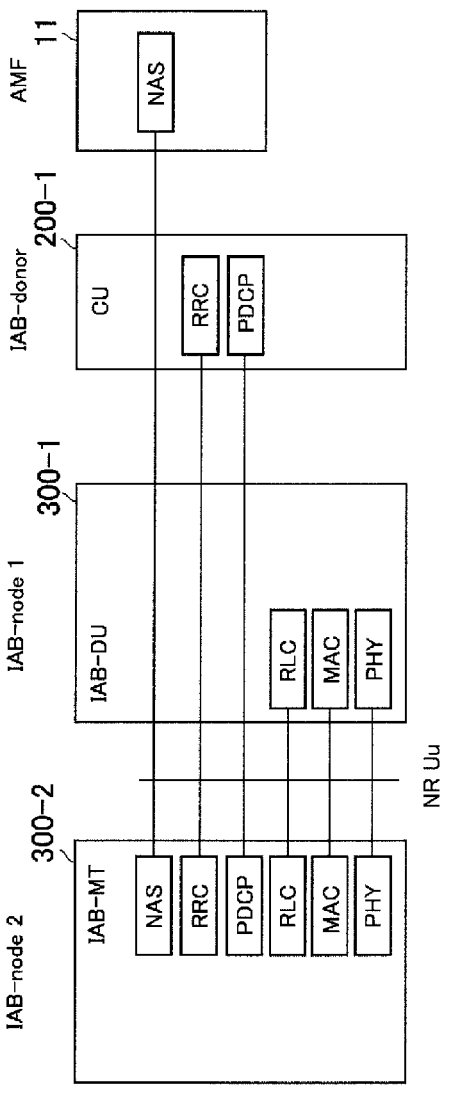
FIG. 6 is a diagram illustrating a protocol stack related to an RRC connection and an NAS connection of IAB-MT.

Configuration of Protocol Stack A configuration of the protocol stack according to an embodiment will be described. FIG. 6 is a diagram illustrating an example of a protocol stack related to an RRC connection and an NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, a retransmission process through a hybrid ARQ (HARQ), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines transport formats (transport block sizes, modulation and coding schemes (MCSs)) in the uplink and the downlink and resource blocks to be allocated.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor gNB 200-1 via a radio bearer.

The RRC layer controls a logical channel, a transport channel, and a physical channel according to establishment, reestablishment, and release of a radio bearer. RRC signaling for various configurations is transmitted between the RRC layer of the IAB-MT of the IAB node 300-2 and the RRC layer of the donor gNB 200-1. With an RRC connection to the donor gNB 200-1, the IAB-MT is in an RRC connected state. With no RRC connection to the donor gNB 200-1, the IAB-MT is in an RRC idle state.

The NAS layer higher than the RRC layer performs session management, mobility management, and the like. NAS signaling is transmitted between the NAS layer of the IAB-MT of the IAB node 300-2 and the AMF 11 of the NAS layer.

Figure 7:
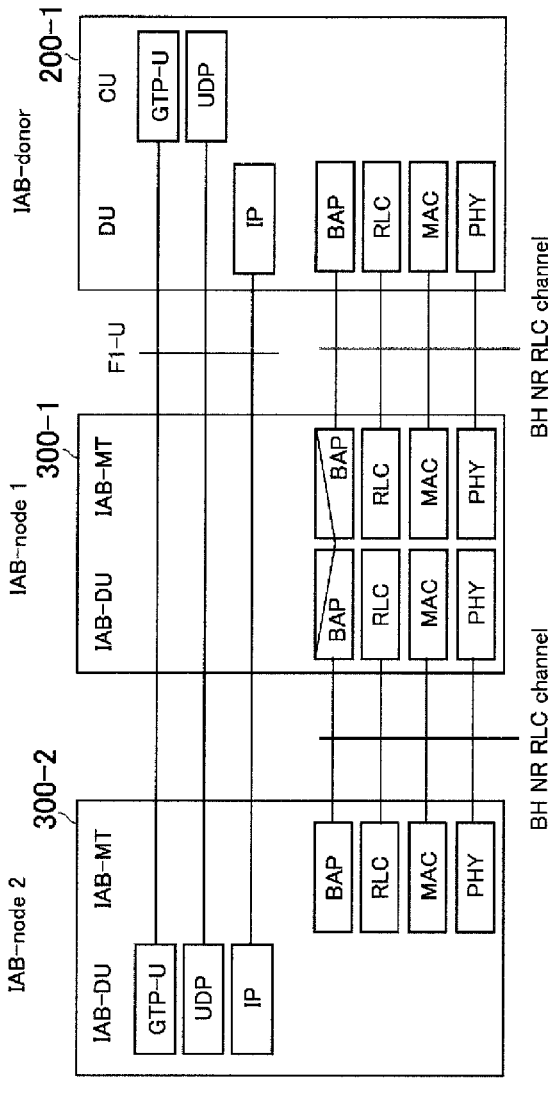
FIG. 7 is a diagram illustrating a protocol stack related to an F1-U protocol.
Figure 8:
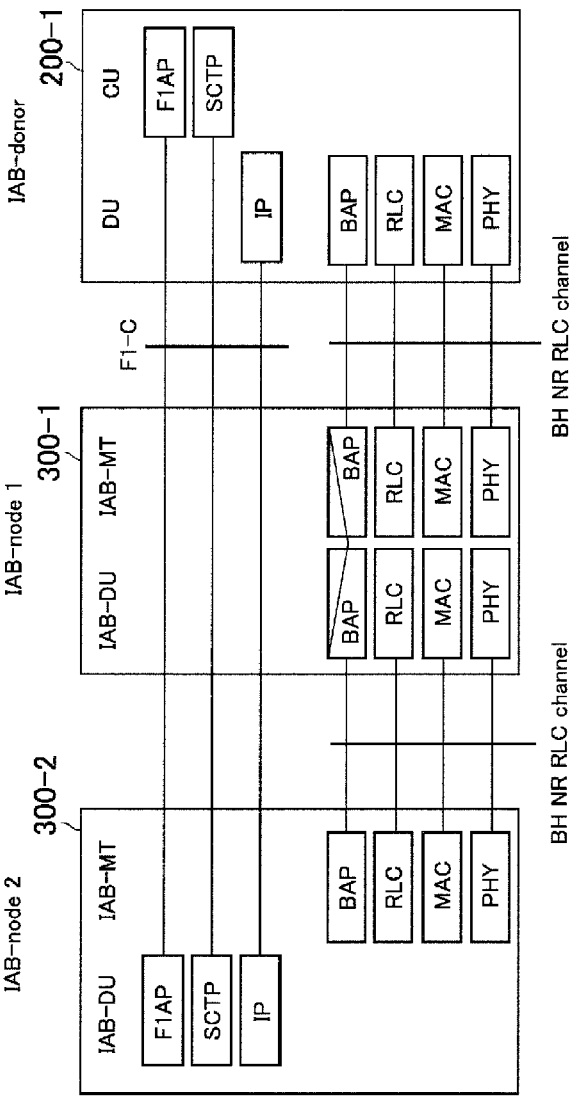
FIG. 8 is a diagram illustrating a protocol stack related to the F1-C protocol.

FIG. 7 is a diagram illustrating an example of a protocol stack for the F1-U protocol. FIG. 8 is a diagram illustrating an example of a protocol stack for the F1-C protocol. Here, an example in which the donor gNB 200-1 is divided into the CU and the DU is illustrated.

As illustrated in FIG. 7, each of the IAB-MT of the IAB node 300-2, the IAB-DU of the IAB node 300-1, the IAB-MT of the IAB node 300-1, and the DU of the donor gNB 200-1 includes a Backhaul Adaptation Protocol (BAP) layer as an upper layer of the RLC layer. The BAP layer is a layer that performs routing processing and bearer mapping and demapping processing. In the backhaul, the IP layer is transmitted via the BAP layer to allow routing through multiple hops.

In each backhaul link, Protocol Data Units (PDUs) of the BAP layer are transmitted by the backhaul RLC channel (BH NR RLC channel). Configuring multiple backhaul RLC channels in each BH link enables the prioritization and QoS control of traffic. The association between the BAP PDU and the backhaul RLC channel is performed by the BAP layer of each IAB node 300 and the BAP layer of the donor gNB 200-1.

As illustrated in FIG. 8, the protocol stack of the F1-C protocol includes an F1AP layer and an SCTP layer instead of a GTP-U layer and a UDP layer illustrated in FIG. 7.

Communication Control Method A communication control method in the cellular communication system 1 according to an embodiment will be described. The communication control method according to an embodiment is a method for selecting a candidate cell in which the IAB node 300 exists in (camps on) the cellular communication system 1. In the following, "Selection of a cell" is intended to be a concept including "re-selection of the cell".

Figure 9:
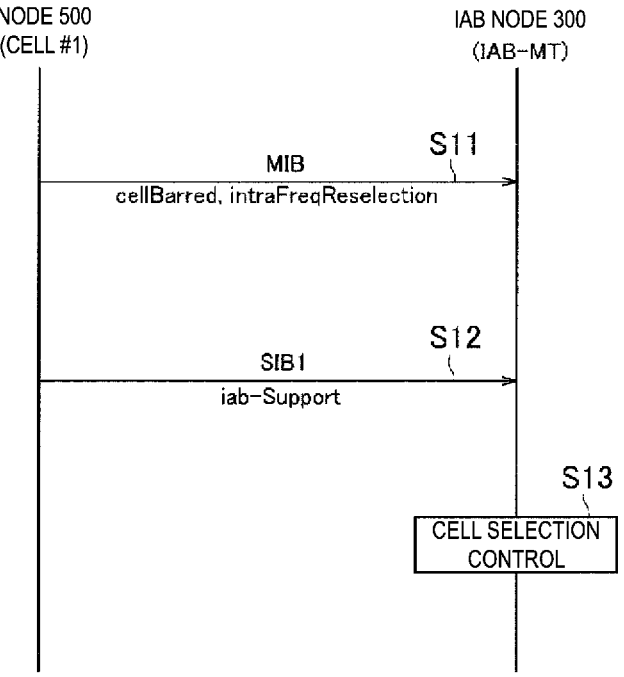
FIG. 9 is a diagram illustrating a communication control method according to an embodiment.

FIG. 9 is a diagram illustrating a communication control method according to an embodiment. Here, the IAB-MT of the IAB node 300 is in an RRC idle state or an RRC inactive state. The RRC inactive state refers to a state in which an RRC connection is suspended. In FIG. 9, the node 500 may be any node as long as it manages a cell, and is, for example, the gNB 200 (DU) or the IAB node 300. The cell managed by the node 500 is referred to as "cell #1".

As illustrated in FIG. 9, in step S11, the node 500 (cell #1) broadcasts a first information element (cellBarred) indicating whether the selection of the cell #1 is barred, and a second information element (intraFreqReselection) regarding whether selection of another cell belonging to the same frequency as that of the cell #1 is allowed when the selection of the cell #1 is barred.

Here, the node 500 (cell #1) broadcasts a master information block (MIB) including the first information element (cellBarred) and the second information element (intraFreqReselection). The MIB includes barred status information of the cell #1 and important PHY layer information of the cell #1 required to receive system information. The MIB is periodically broadcast on a Broadcast channel (BCH).

FIG. 10 is a diagram illustrating an MIB according to an embodiment. As illustrated in FIG. 10, the MIB includes the first information element (cellBarred) and the second information element (intraFreqReselection).

The first information element (cellBarred) is configured with either information indicating that selection of the cell #1 is barred (barred) or information indicating that the selection of the cell #1 is not barred (notBarred).

When the selection of the cell #1 is barred (specifically, when the selection of a cell of the highest rank is barred), the second information element (intraFreqReselection) is configured either with information indicating that the selection of another cell belonging to the same frequency as that of the cell #1 is allowed (allowed) or with information indicating that the selection of another cell belonging to the same frequency as that of the cell #1 is not allowed (notAllowed).

The IAB-MT of the IAB node 300 receives, from the node 500 (cell #1), the MIB including the first information element (cellBarred) and the second information element (intraFreqReselection).

Referring back to FIG. 9, in step S12, the node 500 (cell #1) broadcasts system information block type 1 (SIB1). SIB1 is an example of a system information block. SIB1 includes information that defines scheduling of other system information blocks and that is required for initial access. Unlike MIBs, SIB1 is broadcast periodically on a downlink shared channel (DL-SCH).

When the node 500 (cell #1) supports the IAB node 300, SIB1 includes a third information element (iab-Support) indicating that the cell #1 supports the IAB node 300. "The cell #1 supports the IAB node 300" means that the cell #1 has a function of handling the IAB node 300 and that the selection of the cell #1 as a candidate cell for IAB node 300 is allowed.

The IAB-MT of the IAB node 300 receives SIB1 from the node 500 (cell #1).

In step S13, the IAB-MT of the IAB node 300 performs cell selection control (cell reselection control) based on the MIB received in step S11 and SIB1 received in step S12.

FIG. 11 is a diagram illustrating cell selection control according to an embodiment.

As illustrated in FIG. 11, the IAB-MT of the IAB node 300 determines whether the third information element (iab-Support) has been received from the cell #1. If the IAB-MT of the IAB node 300 receives the third information element (iab-Support) from the cell #1, the IAB-MT determines that the selection of the cell #1 as a candidate cell is allowed. In this case, the IAB-MT of the IAB node 300 may establish or reestablish an RRC connection for the cell #1. On the other hand, if the IAB-MT of the IAB node 300 does not receive the third information element (iab-Support) from the cell #1, the IAB-MT determines that the selection of the cell #1 as a candidate cell is barred. In this case, the IAB-MT of the IAB node 300 establishes or reestablishes no RRC connection for the cell #1.

In an embodiment, even if the IAB-MT of the IAB node 300 does not receive the third information element (iab-Support) from the cell #1, the IAB-MT determines whether the IAB-MT has received the first information element (cellBarred) from the cell #1. Here, whether the selection of the cell #1 is allowed for the IAB node 300 is defined by the third information element (iab-Support). Accordingly, the first information element (cellBarred) can be considered to be an information element for the UE 100. In an embodiment, the first information element (cellBarred) as described above is taken into account by (the IAB-MT of) the IAB node 300.

In response to the first information element (cellBarred) indicating that the selection of the cell #1 is not barred, that is, the first information element (cellBarred) is notBarred, the IAB-MT of the IAB node 300 ignores the second information element (intraFreqReselection). When the IAB-MT of the IAB node 300 ignores the second information element (intraFreqReselection), the restriction of the second information element (intraFreqReselection) is not applied to the IAB-MT. Accordingly, the IAB-MT of the IAB node 300 is allowed to select another cell belonging to the same frequency as that of the cell #1 even if the second information element (intraFreqReselection) is notAllowed.

On the other hand, in response to the first information element (cellBarred) indicating that the selection of the cell #1 is barred, that is, the first information element (cellBarred) is Barred, the IAB-MT of the IAB node 300 takes the second information element (intraFreqReselection) into account without ignoring the second information element. Specifically, the IAB-MT of the IAB node 300 determines whether the selection of another cell belonging to the same frequency as that of the cell #1 is allowed, based on the second information element (intraFreqReselection). Accordingly, if the second information element (intraFreqReselection) is allowed, the IAB-MT of the IAB node 300 determines that the selection of another cell belonging to the same frequency as that of the cell #1 is allowed. If the second information element (intraFreqReselection) is notAllowed, the IAB-MT of the IAB node 300 determines that the selection of another cell belonging to the same frequency as that of the cell #1 is barred.

In this manner, in the communication control method according to an embodiment, the IAB-MT of the IAB node 300 can ignore the second information element (intraFreqReselection) only if the first information element (cellBarred) is notBarred. On the other hand, if the first information element (cellBarred) is barred, the IAB-MT of the IAB node 300 follows the configuration of the second information element (intraFreqReselection).

If the first information element (cellBarred) is barred, the selection of the cell #1 is restricted, and thus the cell #1 is likely to be heavily loaded. If the first information element (cellBarred) is barred, and the second information element (intraFreqReselection) is configured as notAllowed, the UE 100 is restricted from selecting another cell on the same frequency, and the network load is most likely to be high at this frequency. A problem under such a situation is that, assuming that the IAB-MT of the IAB node 300 can ignore the second information element (intraFreqReselection), the selection of another cell on the same frequency causes interference, worsening the situation.

In the communication control method according to an embodiment, the IAB-MT of the IAB node 300 can ignore the second information element (intraFreqReselection) only if the first information element (cellBarred) is notBarred. Thus, the problem as described above can be solved.

Variations

A communication control method according to a variation will be described focusing on differences from the communication control method according to the above-described embodiment.

The communication control method according to the variation is a method for selecting a candidate cell in which the IAB node 300 exists in the cellular communication system 1.

The communication control method according to the variation includes the step of transmitting, by the node 500 managing the cell #1, the first information element (cellBarred) indicating whether the selection of the cell #1 is barred, and the second information element regarding whether the selection of another cell belonging to the same frequency as that of the cell #1 is allowed when the selection of the cell #1 is barred. Here, the first information element (cellBarred) may be applied to both the IAB node 300 and the UE 100.

The step of transmitting includes the step of transmitting a second information element for the IAB node 300 (intraFreqReselection_IAB) as an information element separate from the second information element for the UE 100 (intraFreq Reselection). In other words, the intraFreq Reselection_IAB is the second information element dedicated to the IAB node 300. Thus, whether the selection of another cell belonging to the same frequency as that of the cell #1 is allowed can be controlled separately for the UE 100 and for the IAB node 300.

In the variation, the node 500 transmits a master information block (MIB) including the second information element for the UE 100 (intraFreqReselection). On the other hand, the node 500 transmits a system information block including the second information element for the IAB node 300 (intraFreq Reselection_IAB). Here, the system information block may be SIB1. The IAB-MT of the IAB node

300 checks whether SIB1 includes the third information element (iab-Support). Accordingly, the second information element for the IAB node 300 (intraFreq Reselection_IAB) included in SIB1 allows the IAB-MT of the IAB node 300 to efficiently check the second information element for the IAB node 300 (intraFreq Reselection_IAB). An example will be described below in which SIB1 includes the second information element for the IAB node 300 (intraFreq Reselection_IAB). However, a system information block other than SIB1 may include intraFreq Reselection_IAB, or an MIB may include intraFreq Reselection_IAB.

Figure 12:
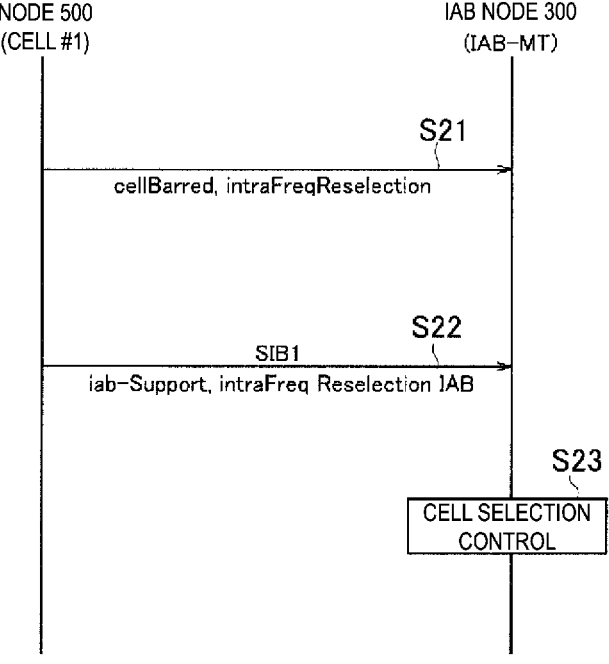
FIG. 12 is a diagram illustrating a communication control method according to a variation.

FIG. 12 is a diagram illustrating the communication control method according to the variation. Here, the IAB-MT of the IAB node 300 is in the RRC idle state or the RRC inactive state. In FIG. 12, the node 500 may be any node as long as it manages the cell, and is, for example, the gNB 200 (DU) or the IAB node 300.

As illustrated in FIG. 12, in step S21, the node 500 (cell #1) broadcasts an MIB including the first information element (cellBarred) indicating whether the selection of the cell #1 is barred, and the second information element (intraFreqReselection) regarding whether the selection of another cell belonging to the same frequency as that of the cell #1 is allowed when the selection of the cell #1 is barred. The IAB-MT of the IAB node 300 receives, from the node 500 (cell #1), the MIB including the first information element (cellBarred) and the second information element (intraFreqReselection).

In step S22, the node 500 (cell #1) broadcasts system information block type 1 (SIB1). When the node 500 (cell #1) supports the IAB node 300, SIB1 includes the third information element (iab-Support) indicating that the cell #1 supports the IAB node 300. SIB1 may include the second information element for the IAB node 300 (intraFreq Reselection_IAB).

Although the details will be provided below, the second information element for the IAB node 300 (intraFreq Reselection_IAB) may be an information element indicating that the selection of another cell belonging to the same frequency as that of the cell #1 is barred. Accordingly, only if the IAB node 300 is barred from selecting another cell belonging to the same frequency as that of the cell #1, the node 500 (cell #1) includes and transmits, in SIB1, the second information element for the IAB node 300 (intraFreq Reselection_IAB). On the other hand, if the IAB node 300 is allowed to select another cell belonging to the same frequency as that of the cell #1, the node 500 (cell #1) omits the transmission of the second information element for the IAB node 300 (intraFreq Reselection_IAB).

The IAB-MT of the IAB node 300 receives SIB1 from the node 500 (cell #1).

In step S23, the IAB-MT of the IAB node 300 performs cell selection control (cell reselection control) based on the MIB received in step S21 and SIB1 received in step S22. Here, the IAB-MT of the IAB node 300 determines whether the selection of another cell belonging to the same frequency as that of the cell #1 is allowed based on the second information element for the IAB node 300 (intraFreq Reselection_IAB) rather than based on the second information element for the UE 100 (intraFreqReselection).

FIG. 13 is a diagram illustrating the cell selection control according to the variation. Here, it is assumed that the first information element (cellBarred) included in the MIB is barred, that is, the UE 100 is barred from selecting the cell #1. It is also assumed that the third information element (iab-Support) is not included in SIB1, that is, the IAB node

300 is barred from selecting the cell #1. Accordingly, neither the UE 100 nor the IAB node 300 can select the cell #1.

As illustrated in FIG. 13, the UE 100 determines whether the selection of another cell belonging to the same frequency as that of the cell #1 is allowed based on the second information element for the UE 100 (intraFreqReselection) rather than based on the second information element for the IAB node 300 (intraFreq Reselection_IAB).

On the other hand, the IAB-MT of the IAB node 300 determines whether the selection of another cell belonging to the same frequency as that of the cell #1 is allowed based on the second information element for the IAB node 300 (intraFreq Reselection_IAB) rather than based on the second information element for the UE 100 (intraFreqReselection).

Thus, for example, even if the second information element for the UE 100 (intraFreqReselection) is notAllowed, the second information element for the IAB node 300 (intraFreq Reselection_IAB) can allow the IAB node 300 to select another cell belonging to the same frequency as that of the cell #1. Even if the second information element for the UE 100 (intraFreqReselection) is Allowed, the second information element for the IAB node 300 (intraFreq Reselection_IAB) can bar the IAB node 300 from selecting another cell belonging to the same frequency as that of the cell #1.

Figure 14:
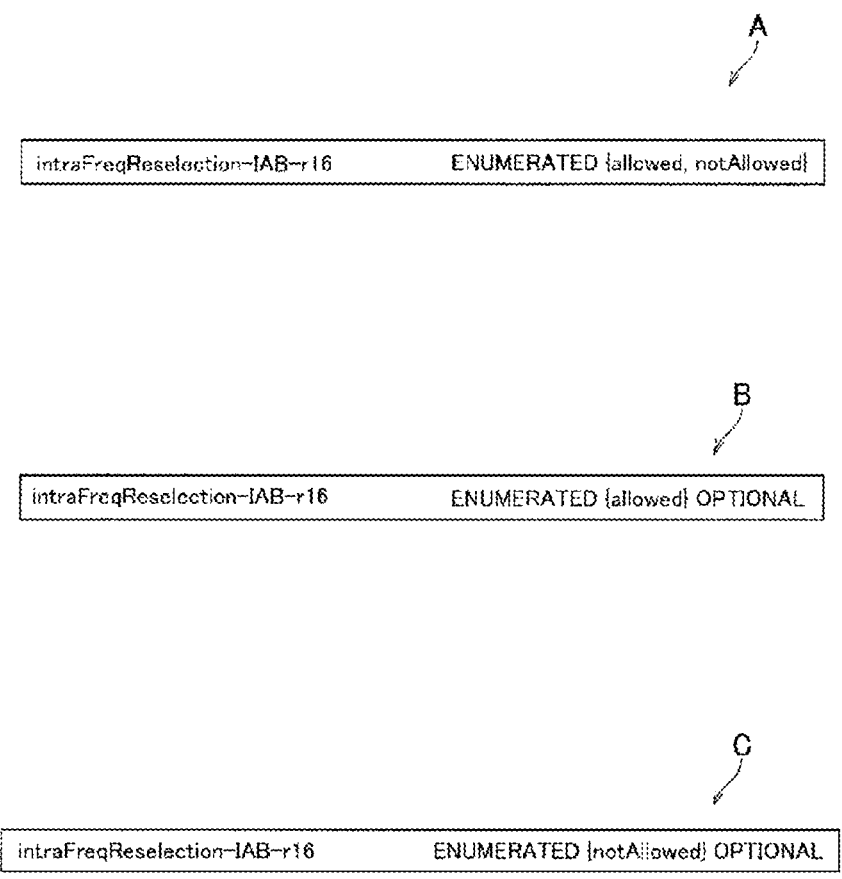
FIG. 14 is a diagram illustrating Configuration Examples A to C of a second information element (intraFreq Reselection_IAB) for an IAB node.

Configuration examples of the second information element for the IAB node 300 (intraFreq Reselection_IAB) will be described. FIG. 14 is a diagram illustrating Configuration Examples A to C of the second information element for the IAB node 300 (intraFreq Reselection_IAB).

As illustrated in FIG. 14, in Configuration Example A, the second information element for the IAB node 300 (intraFreq Reselection_IAB) is a mandatory information element of SIB1. The second information element (intraFreq Reselection_IAB) in Configuration Example A is configured with either information indicating that the selection of another cell belonging to the same frequency as that of the cell #1 is allowed (allowed) or information indicating that the selection of another cell belonging to the same frequency as that of the cell #1 is not allowed (notAllowed). According to Configuration Example A, the second information element for the IAB node 300 (intraFreq Reselection_IAB) is a mandatory information element, and thus even a network not supporting the IAB node 300 needs to always include the second information element (intraFreq Reselection_IAB) in SIB1. This may cause inefficiency.

In Configuration Example B, the second information element for the IAB node 300 (intraFreq Reselection_IAB) is an optional information element of SIB1. The second information element (intraFreq Reselection_IAB) in Configuration Example B is configured only with the information indicating that the selection of another cell belonging to the same frequency as that of the cell #1 is allowed (allowed). On the other hand, if SIB1 does not include a second information element for the IAB node 300 (intraFreq Reselection_IAB), this implicitly indicates that the selection of another cell belonging to the same frequency as cell #1 is barred.

In Configuration Example C, the second information element for the IAB node 300 (intraFreq Reselection_IAB) is an optional information element of SIB1. The second information element (intraFreq Reselection_IAB) in Configuration Example C is configured only with the information indicating that the selection of another cell belonging to the same frequency as that of the cell #1 is barred (notAllowed). On the other hand, if SIB1 does not include the second information element for the IAB node 300 (intraFreq Reselection_IAB), this implicitly indicates that the selection of another cell belonging to the same frequency as that of the cell #1 is allowed.

OTHER EMBODIMENTS

A possible method that allows the UE 100 and the IAB node 300 to individually control whether the selection of another cell belonging to the same frequency as that of the cell #1 is allowed is to control activation/deactivation of broadcast of the third information element (iab-Support) in adjacent cells. For example, when none of the adjacent cells at the same frequency broadcast the third information element (iab-Support), the IAB-MT fails to select another cell at the same frequency. Employing such a method requires coordinated control between the gNBs 200 or between the gNB 200 and the IAB node 300 (IAB-DU).

Figure 15:
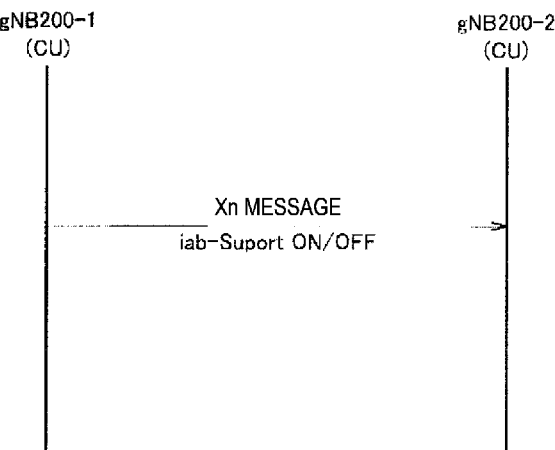
FIG. 15 is a diagram illustrating coordinated control between gNBs.

FIG. 15 is a diagram illustrating the coordinated control between the gNBs 200. As illustrated in FIG. 15, a gNB 200-1 (CU) transmits, to a gNB 200-2 (CU) on an inter-base station interface (Xn interface), an inter-base station message including an information element indicating support-ON/OFF for the IAB node 300.

Here, the inter-base station message (Xn message) may be a message for requesting setup of the Xn interface (XN SETUP REQUEST), a message for updating the configuration of the gNB 200-1 (NG-RAN NODE CONFIGURATION UPDATE), or a message for requesting activation of the cell (CELL ACTIVATION).

The information element indicating support-ON/OFF for the IAB node 300 may notify support-ON/OFF for the cell of the gNB 200-1 and/or the cell of the IAB node 300 lower than the gNB 200-1. The information element indicating support-ON/OFF for the IAB node 300 may request support-ON/OFF for the cell of the gNB 200-2 and/or the cell of the IAB node 300 lower than the gNB 200-2. The information element indicating support-ON/OFF for the IAB node 300 may include a list of identifiers of target cells and/or a list of identifiers of target nodes.

Figure 16:
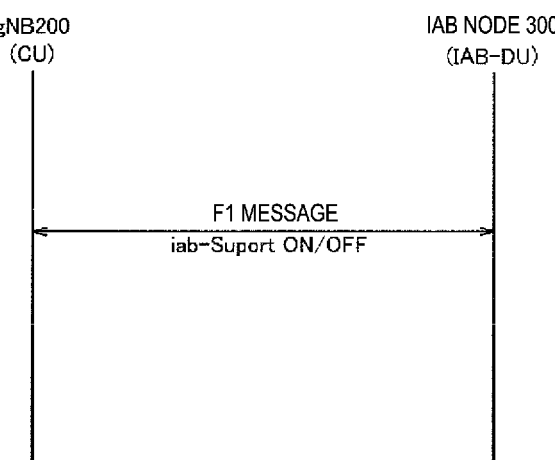
FIG. 16 is a diagram illustrating coordinated control between a gNB and an IAB node (IAB-DU).

FIG. 16 is a diagram illustrating the coordinated control between the gNB 200 and the IAB node 300 (IAB-DU). As illustrated in FIG. 16, the gNB 200 (CU) transmits, to the IAB node 300 (IAB-DU) on a fronthaul interface (F1 interface), a fronthaul message (F1 message) including an information element indicating support-ON/OFF for the IAB node 300. In contrast, the IAB node 300 (IAB-DU) may transmit, to the gNB 200 (CU) on the fronthaul interface (F1 interface), a fronthaul message (F1 message) including an information element indicating support-ON/OFF for the IAB node 300.

Here, the fronthaul message (F1 message) may be a message for updating the configuration of the DU (GNB-DU CONFIGURATION UPDATE) or a message for setting up the F1 interface (F1 SETUP RESPONSE).

The information element indicating support-ON/OFF for the IAB node 300 may notify support-ON/OFF for the cell of the gNB 200 and/or the cell of the IAB node 300 lower than the gNB 200. The information element indicating support-ON/OFF for the IAB node 300 may request support-ON/OFF for the cell of the gNB 200 and/or the cell of the IAB node 300 lower than the gNB 200. The information element indicating support-ON/OFF for the IAB node 300 may include a list of identifiers of target cells and/or a list of identifiers of target nodes.

In the embodiments and variations described above, an example has been mainly described, in which the cellular communication system 1 is a 5G cellular communication system. However, the base station in the cellular communication system 1 may be an eNB that is an LTE base station. The core network in the cellular communication system 1 may be an Evolved Packet Core (EPC). The gNB can be connected to the EPC, the eNB can be connected to the 5GC, and the gNB and the eNB may be connected via an inter-base station interface (Xn interface, X2 interface).

A program may be provided that causes a computer to execute each of the processing operations according to the embodiments and the variations described above. The program may be recorded in a computer-readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like. A chip set may be provided that includes a memory that stores a program for executing each of the processing operations performed by the UE 100, the gNB 200, or the IAB node 300 and a processor that executes the program stored in the memory.

Additional Note

INTRODUCTION

Work items related to Integrated Access and Backhaul (IAB) define an IAB donor and an IAB node, which are new entities, to enable NR multihop and topological networking. These entities are considered to be network nodes, and thus special processing for access restrictions has been agreed with as follows.

both the support of the IAB node and the cell state of the IAB node are integrated into a single IE. That is, if the IE exists, the cell supports IAB, the cell is considered to be a candidate for IAB. If the IE does not exist, the cell does not support IAB and/or the cell is barred from supporting IAB.

the IE may be provided for each PLMN.

the IAB-MT ignores IE cellBarred, cellReservedForOtherUse, and cellReservedForOperatorUse. When any problem is identified, the problem should be discussed in the next meeting.

the IAB-MT is not under control of UAC.

The agreement for the IAB-MT in RRC idle has been reached as follows.

the IAB-MT is assumed to exclude barred cells from candidates for cell selection/reselection for 300 seconds, as is the case with the current specifications.

the IAB-MT ignores intraFreqReselection.

R2 attempts to support the IAB function in non-public network deployment. If an agreeable CR is achieved before ASN. 1 is frozen, the CR is supported. Otherwise, the CR is not supported in R16.

In this note, the remaining problems with the idle mode procedure of the IAB-MT will be discussed.

Discussion cellReservedForFutureUse IE

RAN2 has agreed that "cellReservedForOtherUse is used to prevent Rel-15 UE from accessing a cell" and "new Rel-16 IE with a role that is the same as and/or similar to the role of cellReservedForOtherUse in Rel-15 UE is specific to the cell". As a result, RAN2 has created new IE cellReservedForFutureUse in CellAccessRelatedInfo in TS 38.331 as follows, and defined cellReservedForFutureUse in TS 38.304 as follows.

```
                    TS 38.331

CellAccessRelatedInfo ::=
    SEQUENCE {
        plmn-IdentityList
            PLMN-IdentityInfoList,
        cellReservedForOtherUse
            ENUMERATED {true} OPTIONAL, -- Need R
        ...,
        [[
        cellReservedForFutureUse-r16
        ENUMERATED {true} OPTIONAL, -- Need R
        npn-IdentityInfoList-r16
        NPN-IdentityInfoList-r16 OPTIONAL -- Need R
        ]]
    }
```

TS 38.304 cellReservedForOtherUse (IE type: "true") cellReservedForOtherUse is indicated in the SIB1 message. When a plurality of PLMNs is indicated in SIB1, this field is common to all the PLMNs.

cellReservedForFutureUse (IE type: "true") cellReservedForFutureUse is indicated in the SIB1 message. When a plurality of PLMNs or NPNs are indicated in SIB1, this field is common to all the PLMNs and NPNs.

An NPN cell and further a PLMN cell may also broadcast cellReservedForFutureUse="true" for some reason such as network maintenance. In this case, how the IAB-MT operates is not clear. Several interpretation options are available as follows:

Option 1: The IAB-MT considers the cell to be barred. This is the same operation as that for Rel-16 UE.

Option 2: The IAB-MT should also ignore cellReservedForFutureUse. This may be consistent with the RAN agreement that "the IAB-MT ignores the IE cellBarred, cellReservedForOtherUse, and cellReservedForOperatorUse" and that "the IAB-MT is not under control of UAC" when the IAB node is considered to be a network node.

Based on our observations, any operation is acceptable. However, the operation should be specified for this release and future revision.

Proposal 1: Regardless of the support of IAB in the NPN, RAN2 should clarify whether the IAB-MT ignores cellReservedForFutureUse.

FIG. 17 illustrates an example of specification change effected when for Proposal 1, Option 2 is agreed on, that is, when the IAB node ignores cellReservedForFutureUse. In the other case (i.e., in Option 1), the specifications need not be changed.

intraFreqReselection IE

Email discussions resulted in the agreement that "the IAB-MT ignores intraFreqReselection". The motivation for the IAB node ignoring intraFreqReselection was to provide the operator with individual control of the UE and the IAB-MT. Thus, the agreement has actually satisfied the motivation.

Observation 1: The motivation for agreeing to ignore intraFreqReselection was to provide the operator with individual control of the UE and the IAB-MT.

However, according to a summary of the email discussions, "a small majority (6:4) may prefer the IAB-MT complying with intraFreqReselection as legacy UE". This means that six companies including two operators were concerned about the risk of ignoring intraFreqReselection. The agreement means that the IAB-MT definitely cannot be controlled by the network in connection with the intraFreqReselection.

Observation 2: The agreement that intraFreqReselection is ignored means that the IAB-MT is not under network control of intraFreqReselection.

In light of the individual control in Observation 1, it is suboptimal that the UE is controllable, whereas the IAB-MT is uncontrollable, as in Observation 2. The reason is as follows: when the best cell bars both the UE and the IAB-MT, that is, when cellBarred="barred", and iab-support is not present, and intraFreqReselection="notAllowed", the UE cannot reselect another cell within the frequency band. However, the IAB-MT ignores IE and can thus reselect another cell within the frequency band. This definitely corresponds to a type of individual control.

When the companies are still concerned about the agreement, for example, the companies have concern about possible critical interference, studies may be conducted about introduction of individual intraFreqReselection specific to the IAB-MT, that is, "intraFreqReselection-IAB". New IE is considered by the IAB-MT, but is ignored by UE. In any event, the IAB-MT needs to confirm the iab-Support IE in SIB1, and thus "intraFreqReselection-IAB" may be broadcast in SIB1 (instead of MIB), as necessary. "intraFreqReselection-IAB" may reduce network coordination between cells. For example, the serving cell can configure new IE without recognizing whether adjacent cells have removed iab-Support IE from SIB1, but this does not apply to the legacy intraFreqReselection.

Note that this is not intended to restudy the above-described agreement but is intended as a simple addition to the agreement for the purpose of eliminating all concerns raised in the email discussions related to the control of intraFreqReselection.

Proposal 2: When the IAB-MT needs to be placed under network control, RAN2 should study whether to introduce individual "intraFreqReselection-IAB" into SIB1. This applies only to the IAB-MT.

FIGS. 18 and 19 illustrate examples of specification changes effected when Proposal 2 is agreed on.

The invention claimed is:

1. A communication control method for selecting a candidate cell in which a predetermined node exists in a cellular communication system, the communication control method comprising:

transmitting, by a node configured to manage a cell, a master information block including a first information element and a second information element, the first information element indicating whether selection of the cell is barred, the second information element indicating whether selection of another cell belonging to a frequency identical to a frequency of the cell is allowed for a user equipment when the selection of the cell is barred transmitting a system information block including a third information element indicating whether selection of another cell belonging to a frequency identical to a frequency of the cell is allowed for the predetermined node being different from the user equipment when the selection of the cell is barred, determining, by the predetermined node, whether the selection of another cell belonging to a frequency identical to a frequency of the cell is allowed based on the third information element rather than based on the second information element, and selecting, by the predetermined node, the candidate cell based on the determining step.

2. The communication control method according to claim 1, wherein the third information element an information element indicating that the selection of another cell belonging to a frequency identical to a frequency of the cell is barred.

3. The communication control method according to claim 2, further comprising:

omitting transmission of the third information element when the selection of another cell belonging to a frequency identical to a frequency of the cell is allowed.

4. A predetermined node that is not a user equipment, the node comprising:

a processor and a memory, and a receiver configured to receive a master information block including a first information element and a second information element, the first information element indicating whether selection of the cell is barred, the second information element indicating whether selection of another cell belonging to a frequency identical to a frequency of the cell is allowed for a user equipment when the selection of the cell is barred, the receiver configured to receive a system information block including a third information element indicating whether selection of another cell belonging to a frequency identical to a frequency of the cell is allowed for a predetermined node being different from the user equipment when the selection of the cell is barred, and the processor configured to:

determine whether the selection of another cell belonging to a frequency identical to a frequency of the cell is allowed based on the third information element rather than based on the second information element, and select the candidate cell based on the above determining.

5. A chipset provided in a predetermined node that is not a user equipment, the chipset comprising a processor and a memory, the processor configured to manage a cell, and receive a master information block including a first information element and a second information element, the first information element indicating whether selection of the cell is barred, the second information element indicating whether selection of another cell belonging to a frequency identical to a frequency of the cell is allowed for a user equipment when the selection of the cell is barred, the processor is configured to receive a system information block including a third information element indicating whether selection of another cell belonging to a frequency identical to a frequency of the cell is allowed for a predetermined node being different from the user equipment when the selection of the cell is barred, and the processor configured to:

determine whether the selection of another cell belonging to a frequency identical to a frequency of the cell is allowed based on the third information element rather than based on the second information element, and select the candidate cell based on the above determining.

\* \* \* \* \*